United States Patent [19]

Hsu et al.

[11] Patent Number: 4,590,106

[45] Date of Patent: * May 20, 1986

[54] HEAT RESISTANT HEAT SHRINKABLE FILMS

[75] Inventors: Joseph C. Hsu; Donald W. Vought, both of Neenah; George H. Walbrun, Menasha, all of Wis.

[73] Assignee: American Can Company, Greenwich, Conn.

[*] Notice: The portion of the term of this patent subsequent to Feb. 26, 2002 has been disclaimed.

[21] Appl. No.: 709,099

[22] Filed: Mar. 7, 1985

Related U.S. Application Data

[62] Division of Ser. No. 538,558, Nov. 10, 1983, Pat. No. 4,541,983, which is a division of Ser. No. 308,950, Mar. 17, 1985, Pat. No. 4,501,779.

[51] Int. Cl.$^4$ .................... B65D 11/00; B32B 7/02
[52] U.S. Cl. ...................... 428/35; 428/518; 428/349; 428/913; 264/176 R; 156/244.11
[58] Field of Search ............... 428/35, 518, 520, 349, 428/913; 156/244.11; 264/176 R, 289.6

[56] References Cited

U.S. PATENT DOCUMENTS

| | | | |
|---|---|---|---|
| 3,524,795 | 8/1970 | Peterson | 428/518 |
| 3,558,399 | 1/1971 | Turner | 428/518 |
| 3,579,416 | 5/1971 | Schrenk | 428/518 |
| 4,161,562 | 7/1979 | Yoshikawa et al. | 428/215 |
| 4,424,243 | 1/1984 | Nishimoto et al. | 428/36 |
| 4,501,779 | 2/1985 | Hsu et al. | 428/518 |

*Primary Examiner*—Edith Buffalow
*Attorney, Agent, or Firm*—Stuart S. Bowie; Thomas D. Wilhelm

[57] ABSTRACT

A three layer heat shrinkable film is disclosed, along with preferred process for making it. The film comprises a first heat sealable layer of an ionomer, a second layer of a vinylidene chloride copolymer, and a third layer of a blend of an ionomer and an EVA copolymer. The EVA content is no greater than 20% of the blend by weight, and the vinyl acetate content is at least 4.5% of the blend by weight. In the preferred process, a three layer tape is coextruded and cooled, and reheated to 197°–203° F., and oriented in a conventional double bubble process.

10 Claims, No Drawings

HEAT RESISTANT HEAT SHRINKABLE FILMS

This is a division of application Ser. No. 538,558, filed Nov. 10, 1983, now U.S. Pat. No. 4,541,983 which is a division of Ser. No. 308,950 filed Mar. 17, 1985 now U.S. Pat. No. 4,501,779.

BACKGROUND OF THE INVENTION

Heat shrinkable polymer films have gained substantial acceptance for such uses as the packaging of foodstuffs. This invention pertains to improvements in heat shrinkable films of this nature. The films embodying this invention are normally used as heat shrinkable bags supplied to the food processor with one open end, to be closed and sealed after insertion of the product. After the product is inserted, air is normally evacuated, the open end of the bag is closed, such as by heat sealing, or other means, and finally heat is applied, such as by hot water, to initiate film shrinkage about the product.

Successful shrink bags must satisfy a multiplicity of requirements imposed by both the bag producer and the bag user. Of primary importance to the bag user is the capability of the bag to survive physically intact the processes of being filled, evacuated, sealed closed and heat shrunk. The bag must also be strong enough to survive the material handling involved in moving the contained product along the distribution system.

The bag producer desires a product which can be produced competitively on conventionally available equipment, such as shown in U.S. Pat. No. 4,161,562, while meeting the performance requirements of the user. Thus the bag material should be readily extrudable and susceptible to orientation with sufficient leeway in process parameters as to allow for efficient film production. The orientation temperature should be a temperature which is economically achieved by the producer, and which provides for use of economical shrink processes by the bag user.

Conventional shrink bags have generally been constructed of layers comprising predominantly ethylene vinyl acetate (EVA) copolymers which may or may not be crosslinked, and, in some cases, contain a layer of vinylidene chloride copolymer. However, the use of structures containing predominantly EVA may not always be desirable.

As will be appreciated, the processes of stretching the film, and later shrinking it, expose the film to rather severe physical stresses, due to the nature of the operations. In between the stretching and shrinking operations, the film may be subjected to rather harsh tests of its physical capabilities by the various handlings and environments to which it is exposed. It may, for example be shipped in a closed truck exposed to the sun's heat. Thus initiation of the shrink properties must not be triggered at too low a temperature.

In some cases it is desirable to have a shrink bag having lower shrink force than is conventionally experienced without sacrificing the amount of shrink. For example, in packaging blocks of cheese, excessive shrink force yields rounded corners on the soft product. Simultaneously, it is important to retain the conventional amount of shrinkage to ensure film conformity to the product.

In the production of bags, the bags are frequently mounted on adhesively taped rolls; wherein the user removes a bag by forcefully pulling it off the adhesive tape. Thus the interlayer adhesion in the multiple layer bag structure must be sufficient to ensure that the layers of the bag remain adhered to each other during the removal process, helping to provide for the overall internal cohesion of the structure. The bag must have a balance of heat sealability properties, such that the bag can be heat sealed closed over a range of conditions acceptable to commercial operation without excessive faulty seals or burn-throughs. Finally, all these properties must be met in a bag which can be easily laid flat in a shipping container, such as a cardboard box, without undue curling or twisting of the bags.

It is an object of this invention to provide a novel heat shrinkable film which gives improved control of the shrink force while maintaining a high degree of shrink capability.

It is another object to provide such a film which has good heat sealability characteristics and structural cohesion.

It is still another object to provide a process for making a multiple layer tubular film which provides improved control of the shrink process and has good heat sealability characteristics.

SUMMARY OF THE INVENTION

It has now been found that certain improvements in heat shrinkable films are achieved in three layer films wherein the first layer is a heat sealable ionomer, the second layer is a vinylidene chloride copolymer, and the third layer is a blend of an ionomer and an EVA copolymer. The EVA content of the blend is no greater than 20% of the blend by weight, and the vinyl acetate content is at least 4.5% of the blend by weight. In preferred embodiments, the EVA content is between about 15% and 20% of the blend by weight and the vinyl acetate content is about 22% to 33% of the EVA copolymer by weight.

The invention is further exemplified in a heat shrinkable bag made from the three layer film disclosed, wherein the heat sealable ionomer layer is disposed on the inside surface of the bag, and is heat sealed at facing portions of itself when the ends of the bag are closed. The blend layer is on the outside surface of the bag and contacts the heating seal jaws during the heat sealing operation.

The invention is also exemplified in a process for making a three layer heat shrinkable film. The process is initiated by coextruding a three layer tape having first, second and third layers as hereinbefore disclosed. The tape is cooled below the crystalline melting temperatures of each of the three layers, and then reheated to a temperature of about 197°–203° F., and oriented to form a film by blowing a bubble in the heated tape and providing an appropriate draw to the film to provide an oriented film having normally balanced shrink properties.

DETAILED DESCRIPTION OF THE PREFERRED EMBODIMENTS

After much work and exploration, the inventors herein have found a three-layer structure which satisfies the requirements of both the bag producer and the bag user.

The inside layer of the bag is heat sealable ionomer. The middle layer is vinylidene chloride copolymer. The outer layer is a blend of ionomer with an EVA copolymer, such that the vinyl acetate content of the entire blend is at least about 4.5% by weight of the blend, while the EVA content is no more than about 20% by weight of the blend. In meeting the criteria of at least 4.5% vinyl acetate without exceeding 20% EVA, it is seen that the vinyl acetate content of the EVA must equal at least 22%. Preferrably, the vinyl acetate content equals at least 5% of the blend; thus the normal range of vinyl acetate content of the EVA used in this invention is 25% to 33% vinyl acetate, the 33% material being the highest vinyl acetate content available for coextrusion. It is anticipated that, as higher vinyl acetate content copolymers become available, these, too, will be found advantageous for use with the invention. At present, with 33% vinyl acetate being the highest concentration available, a minimum of 15% EVA, based on blend weight, is required. Thus, the EVA is desirably present as 15% to 20% of the blend, with the copolymer being desirably 25%–33% vinyl acetate.

The minimum requirement of 4.5% vinyl acetate is directly related to the generation of adhesion between the outer blend layer and the middle layer of vinylidene chloride copolymer, the 4.5% vinyl acetate being adequate to raise the adhesion level to about 40 grams per inch width, compared to about 4 grams per inch width for pure ionomer in the outer layer.

The maximum of 20% EVA is determined by the needs of the structure. Primarily, a maximum amount of ionomer is desired to enhance heat sealing properties by providing good heat resistance during the heat sealing operation, so that strong seals may be formed without burning holes in the film adjacent the heat seal areas. Secondly, in higher amounts, the EVA is incompatible with ionomer, yielding a cloudy film. Finally, having major proportions of ionomer in both the inner and outer layers is effective to balance the film so that it naturally lays flat, and does not curl, as do some films which have high proportions of different polymers on their opposing faces.

Films of this invention are conveniently made on equipment common to the "double bubble" process. In this process, the film is extruded first as a thick-walled tubular tape, cooled below the crystalline melting temperature of each of the three layers, then reheated and oriented as a bubble to form the film of the invention. Finally, the film is cooled, the bubble is collapsed, and wound up. While the film may be made over a substantial range of operating conditions, it is desirable for the reheat temperature to be at least 195° F. and no more than 205° F. A most preferred temperature range for reheating the tape is 197° to 203° F.

EXAMPLE 1

A tubular three layer tape having sidewalls 16 mils thick was prepared by coextrusion from a 4.5 inch circular die at 320° F. The width of the collapsed tape was 5.85 inches. The outer layer of the tape was about 2.8 mils of a blend of 20% by weight of DuPont Elvax 360 EVA having 25% vinyl acetate content, and 80% by weight DuPont Surlyn 1601 ionomer. The second layer was about 2.8 mils of Dow Saran vinylidene chloride copolymer. The third layer was about 10.4 mils of DuPont Surlyn 1601 ionomer. The tape was cooled to 77° F., then reheated to 197° F. and biaxially oriented in a conventional bubble blowing process. The blow-up ratio was 3.1. The bubble was stretched in the machine direction at a ratio of about 2.3 by having the nip rollers downstream of the bubble pull the tube at a rate 2.3 times as fast as the nip rollers upstream of the bubble let the tape pass. The bubble was finally collapsed and wound up.

The resulting film was 2.25 mils thick; the heat sealable inner layer of Surlyn being 1.45 mils, the Saran layer being 0.4 mil, and the outer blend layer being 0.4 mil.

EXAMPLE 2

A biaxially oriented film was produced as in Example 1 except that the reheat temperature was 203° F.

EXAMPLE 3

A biaxially oriented film was produced as in Example 1 except that 80% Surlyn 1652 ionomer was used in the first layer in place of the 80% Surlyn 1601.

EXAMPLE 4

A biaxially oriented film was produced as in Example 3 except that the reheat temperature was 203° F.

The films from the Examples were tested for free shrink and shrink force, and compared to similar three-layer EVA-based films, both a cross-linked film and an uncross-linked film. Shrink force was tested according to ASTM D-2838. In the percent free shrink test, square samples were cut 100 millimeters on a side and marked for identification in the width machine direction and the cross machine direction. Each sample was placed between two screens and immersed in hot water at the specified temperature for 60 seconds. The samples were withdrawn from the water, dried, and measured in both the with machine and cross machine directions. The amount of shrinkage, in millimeters was noted directly as the percent free shrink.

The results are shown in Tables 1 and 2, with each result being the geometric mean of the readings taken in the with machine direction and the cross machine direction.

TABLE 1

| | Percent Free Shrink | |
| --- | --- | --- |
| | Shrink Temperature | |
| Film | 160° F. | 180° F. |
| EVA | 10% | 25% |
| EVA crosslinked | 10% | 25% |
| Example 1 | 26% | 45% |
| Example 2 | 21% | 43% |
| Example 3 | 24% | 45% |
| Example 4 | 20% | 42% |

TABLE 2

| | Shrink Force, grams/inch | |
| --- | --- | --- |
| | Shrink Temperature | |
| Film | 160° F. | 180° F. |
| EVA | 213 | 281 |
| EVA crosslinked | 274 | 273 |
| Example 1 | 219 | 188 |
| Example 2 | 179 | 158 |
| Example 3 | 186 | 171 |
| Example 4 | 160 | 160 |

As evidenced by the data in Table 1, the films of this invention have a substantially higher percentage of free shrink than either of the EVA materials, compared at either shrink temperature. Further, as seen in Table 2, the shrink force in all the Examples is more moderate at the 180° temperature than either of the EVA-films. At 160° the uncross-linked EVA has a mild shrink force similar to that of Example 1, but is substantially poorer in the amount of free shrink shown in Table 1. Thus the data bears out the superiority of the films of this invention in maximizing shrink amount while moderating the shrink force.

The bag producer must be particularly concerned with the ability of the bag to survive all of the stresses to which it may be exposed during its functional life. While adhesion of the vinylidene chloride copolymer to the heat seal layer is not particularly of concern, the adhesion of the vinylidene chloride copolymer to the outer layer is very important in order to ensure that the outer layer is not torn off the bag when the bag is removed from the mounting tape. Thus a pure layer of ionomer as the outer layer is not satisfactory. However, a high amount of ionomer is desirable, to provide good heat resistance during the heat sealing operation, particularly in forming the final seal after the product is inserted into the bag. It is thus critical that the outer layer have a high percentage of ionomer, while at the same time, that layer must have an adequate adhesion to the vinylidene chloride copolymer. A further benefit of having major proportions of ionomer in both the inner and outer layers is that it gives effective balance to the film and thus gives it desirable lay-flat characteristics.

Film made by this process may be used with conventional shrink tunnel temperatures on the order of 200° F., but, as shown by the data, may also be used with temperatures as low as no more than 160° F. Thus these films are adaptable to commercial operating conditions found on a substantial variety of commercial equipments and processes, including both the older processes operating at about 200° F., and the newer processes operating at about 160° F. to 170° F.

The films made in the Examples were made into bags on conventional bag making equipment, by sealing one end of a section of the tubular film. The bags were then filled with cheese, heat sealed on conventional commercial equipment at normal operating speeds, and observed and tested for leakers. As no leakers were found in the sealed packages, good seal integrity and heat seal capability was affirmed.

The invention is of particular utility, especially in the packaging of cheese, a soft product, wherein it is important to have the low shrink force of the films of the invention, in combination with a high percentage of shrink amounts. While the inventors are unable to explain the behavior of the films of this invention, low shrink force is possibly a result of the blend ratios used and the low reheat temperature.

Thus the invention provides novel heat shrinkable films which give improved control of the shrink force while maintaining a relatively high amount of free shrink, even at low shrink temperatures. Further the film has good heat sealability characteristics and structural cohesion.

Finally, the invention provides a novel process for making the film, wherein it is believed the process is at least partially responsible for the resultant beneficial properties of the film.

Having thus described the invention, what is claimed is:

1. A heat shrinkable oriented three layer film, wherein said film comprises a first heat sealable layer of ionomer having two surfaces, a second layer of a vinylidene chloride copolymer having two surfaces, and having one of said surfaces on said second layer on one said surface of said first layer, and a third outer layer on the other said surface of said second layer, the composition of said third layer being a blend of an ionomer and an ethylene vinyl acetate copolymer, the ethylene copolymer content of said blend being no greater than 20% by weight, the vinyl acetate content of said ethylene vinyl acetate copolymer being at least 22%, and the vinyl acetate content of said blend being at least 4.5% by weight, said film having been made by the process of:
   (a) coextruding a three layer tubular tape having a first inner layer of an ionomer, a second layer of a vinylidene chloride copolymer, and a third layer of a blend of an ionomer and an ethylene vinyl acetate copolymer, wherein the ethylene vinyl acetate copolymer content of said blend is no greater than 20% by weight, the vinyl acetate content of said ethylene vinyl acetate is at least 22%, and the vinyl acetate content of said blend is at least 4.5% by weight;
   (b) cooling said tape below the crystalline melting temperatures of each of the three layers;
   (c) reheating said tape to a temperature of about 195° to 205° F.; and
   (d) orienting said tape to form a film by blowing a bubble in the reheated tape and providing an appropriate draw to the film to provide an oriented film having normally balanced shrink properties, the free shrink of said film at 160° F. being about 20% to 26% and at 180° F. being about 42% to 45%, the shrink force of said film at 160° F. being about 160 to 219 grams per inch and at 180° F. being about 160 to 188 grams per inch.

2. A heat shrinkable oriented three layer film, as in claim 1 wherein the ethylene vinyl acetate content of said blend comprising said third layer is 13.5% by weight to 20% by weight of the overall blend composition.

3. A heat shrinkable oriented three layer film, comprising:
   (a) a first heat sealable layer of ionomer:
   (b) a second layer of a vinylidene chloride copolymer; and
   (c) a third layer of a blend of an ionomer and an EVA copolymer,
   wherein the EVA copolymer content of said blend is no greater than 20% by weight, the vinyl acetate content of said ethylene vinyl acetate is at least 22% and the vinyl acetate content of said blend is at least 4.5%.

4. A film as in claim 3 wherein the EVA content is between about 15% and 20% of the blend by weight and the vinyl acetate content is 25% to 33% of said EVA copolymer.

5. A heat shrinkable bag made from a three layer tubular film, said film comprising:
   (a) a first heat sealable layer of ionomer;
   (b) a second layer of vinylidene chloride copolymer; and
   (c) a third layer of a blend of an ionomer and an EVA copolymer, wherein the EVA copolymer content of said blend is no greater than 20% by weight, the vinyl acetate content of said ethylene vinyl acetate is at least 22% and the vinyl acetate content of said blend is at least 4.5%.

6. A heat shrinkable bag as in claim 1, wherein the EVA content of said blend is between 15% and 20% of said blend by weight and the vinyl acetate content of said EVA copolymer is 25% to 33%.

7. A composition of matter comprising a blend of 15% to 20% by weight EVA and 85% to 80% by weight ionomer, wherein said EVA has a vinyl acetate content of at least 22% vinyl acetate.

8. A composition as in claim 7 and wherein said EVA has a vinyl acetate content between 25% and 33%.

9. A composition as in claim 7 and wherein the vinyl acetate content of said blend is at least 4.5%.

10. A composition as in claim 8 and wherein the vinyl acetate content of said blend is at least 4.5%.

* * * * *